(12) United States Patent
Hofer et al.

(10) Patent No.: US 6,662,920 B2
(45) Date of Patent: Dec. 16, 2003

(54) MULTIPLE DISK IN OIL BATH CLUTCH FOR A VEHICLE DRIVE TRAIN, ESPECIALLY FOR A SPEED DIFFERENCE SENSING CLUTCH

(75) Inventors: Manfred Hofer, Graz (AT); Siegfried Kaltmann, Graz (AT)

(73) Assignee: Steyr Powertrain AG & Co KG, Graz (AT)

( * ) Notice: Subject to any disclaimer, the term of this patent is extended or adjusted under 35 U.S.C. 154(b) by 0 days.

(21) Appl. No.: 10/181,168

(22) PCT Filed: Jan. 26, 2001

(86) PCT No.: PCT/AT01/00020
§ 371 (c)(1),
(2), (4) Date: Jul. 12, 2002

(87) PCT Pub. No.: WO01/55611
PCT Pub. Date: Aug. 2, 2001

(65) Prior Publication Data
US 2003/0000794 A1 Jan. 2, 2003

(30) Foreign Application Priority Data
Jan. 26, 2000 (AT) .......... 49/2000 U

(51) Int. Cl.$^7$ .......... F16D 13/00
(52) U.S. Cl. .......... 192/35; 192/70.2; 192/107 M; 192/113.36

(58) Field of Search .......... 192/107 M, 70.2, 192/113.36, 35, 85 CA

(56) References Cited

U.S. PATENT DOCUMENTS

| | | | |
|---|---|---|---|
| 3,932,568 A | * | 1/1976 | Watts et al. .......... 264/29.7 |
| 5,224,572 A | * | 7/1993 | Smolen, Jr. et al. .. 188/218 XL |
| 5,330,036 A | * | 7/1994 | Nishi et al. .......... 188/251 M |
| 5,901,818 A | * | 5/1999 | Martino .......... 188/218 XL |

FOREIGN PATENT DOCUMENTS

JP 4-181022 A * 6/1992 .......... 192/107 M

* cited by examiner

*Primary Examiner*—Saul Rodriguez
(74) *Attorney, Agent, or Firm*—Bachman & LaPointe, P.C.

(57) ABSTRACT

A wet multi-disk clutch comprises an input member (2) and an output member (3), and first disks (22) and second disks (21), which are connected to the input member (2) and the output member (3) respectively and can be pressed together by actuating means (24). In order to create a low-vibration tribosystem with a long life, the first disks (22) are composed of steel and their friction faces are linings (42) composed of carbon fibers embedded in a carbon matrix and having channels (43) leading from the inside outward, and the second disks (21) are composed of steel and their friction faces are provided with a nickel dispersion layer.

8 Claims, 2 Drawing Sheets

MULTIPLE DISK IN OIL BATH CLUTCH FOR A VEHICLE DRIVE TRAIN, ESPECIALLY FOR A SPEED DIFFERENCE SENSING CLUTCH

BACKGROUND OF THE INVENTION

The invention relates to a wet multi-disk clutch in part of a vehicle drive and a lubricant for a housing containing said clutch, comprising an input member and an output member, and a number of first disks connected to the input member and of second disks connected to the output member, which can be pressed together by actuating means.

Wet multi-disk clutches are used in drive trains of motor vehicles, predominantly in differential locks, in all-wheel drive systems for connecting up the additional drive axle or for changing the torque distribution between the axles.

In these applications, the clutch does not function simply as a selector clutch that can be engaged and disengaged but also as a control clutch and also operates for relatively long periods in slip. In this arrangement, vibrations occur, though sometimes only in the course of the clutch's life, and these are perceived as anything from a low moan to a high-frequency whine. Apart from the fact that this noise is irritating, such vibrations lead to a reduction in service life.

The cause of these vibrations is probably a negative gradient in the friction coefficient. This gradient is taken to mean the reduction in the friction coefficient between the first and second disks as the rotational-speed difference increases. Initially, this is the transition from static friction to sliding friction with a relatively low coefficient of sliding friction; as the rotational-speed difference increases further, the friction coefficient can fall further.

The aim has therefore been to create a tribosystem in which the gradient of the friction coefficient is positive or at least not negative, at least in a certain range. One known solution to this is to choose pairs of disks in which the disks are composed of steel sheet and the first disks are provided with a sintered coating in certain surface patterns. Another known solution is to use fluids that are particularly suitable for wet clutches, as in automatic transmissions for example.

However, it has been found that even such tribosystems cannot reliably prevent the vibrations described, at least not after a certain time in operation, with the result that the disks soon have to be replaced. However, this is disadvantageous, especially in the case of clutches that are integrated into the vehicle drive because changing the disks is generally particularly labor-intensive.

When using such clutches in housings in which other drive components are also accommodated, another difficulty is that the drive components require oils with special lubricating properties, e.g. hypoid oils, but these are less suitable for clutches.

It is therefore the object of the invention to propose a tribosystem for friction clutches that prevents the occurrence of vibrations reliably and for the entire service life, even under the unfavorable conditions described.

SUMMARY OF THE INVENTION

According to the invention, this is achieved by virtue of the fact that the first disks are composed of steel and have on their friction faces linings composed of carbon fibers embedded in a carbon matrix, which linings are interrupted by channels leading from the inside outward, and that the second disks are composed of steel and their friction faces are provided with a nickel dispersion layer.

This tribosystem, which solves the problem set, has been determined in extensive tests. It has furthermore been found that the nickel dispersion layer is particularly effective if it has a crystalline structure and if it furthermore contains 2 to 5 percent by volume of uniformly dispersed titanium nitride.

BRIEF DESCRIPTION OF THE DRAWINGS

The invention is described and explained below with reference to figures, of which.

DETAILED DESCRIPTION

Figure 1:
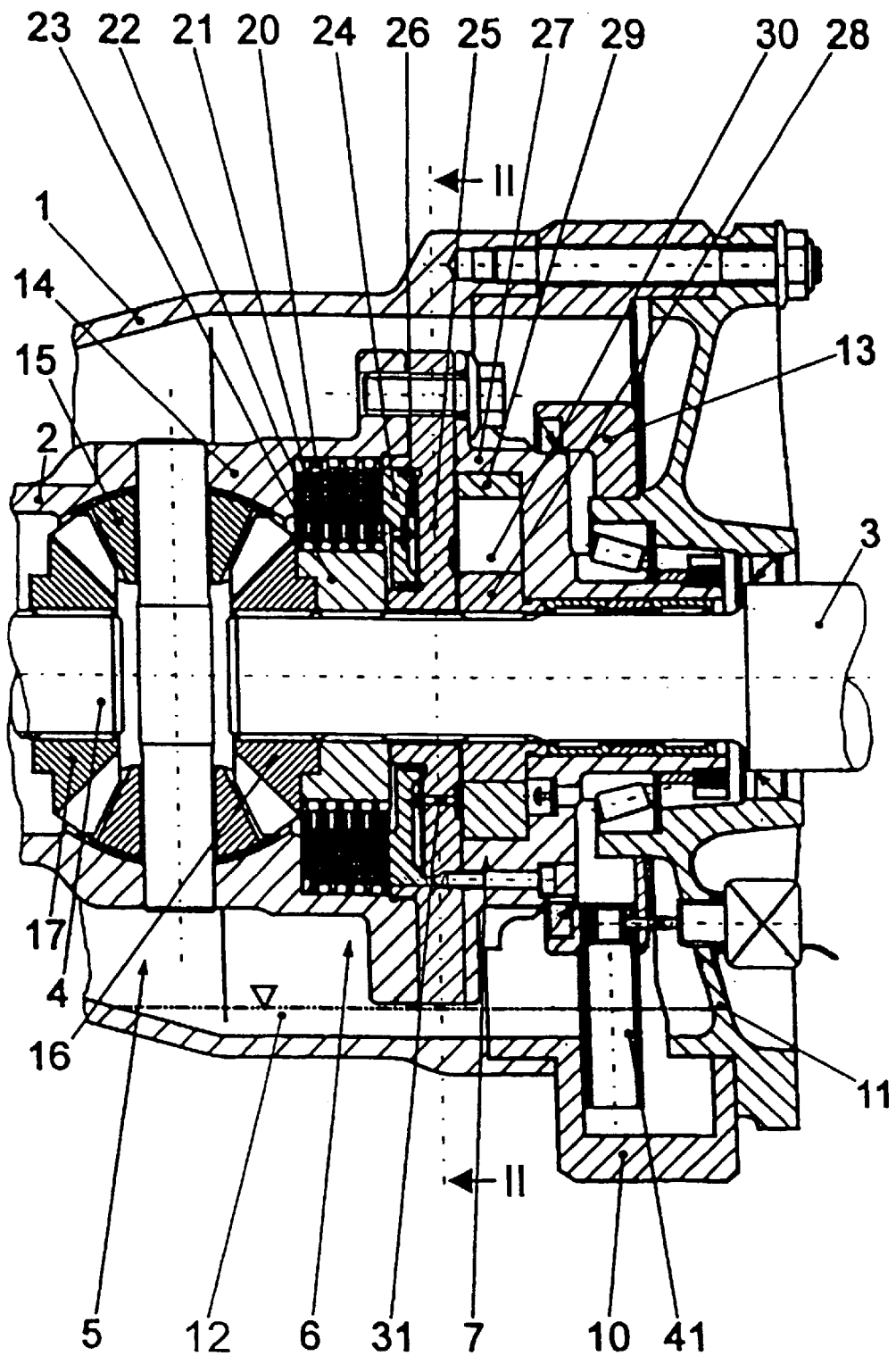
FIG. 1 shows a longitudinal section through a drive component, in which the invention can be employed by way of example.

In FIG. 1, the fixed housing of the drive unit is denoted by 1. A drive housing 2 is driven from a power source that is not shown. A first output shaft 3 and a second output shaft 4 are connected in terms of drive to both wheels on one axle of a vehicle or to two axles of a vehicle, respectively, although this is not shown. The two output shafts 3, 4 are driven by the drive housing 2 via a differential 5. A hydraulic coupling dependent on a differential rotational speed is furthermore provided between the drive housing 2 and the first output shaft 3, comprising a friction clutch 6 and a hydrostatic displacement machine 7.

The housing 1 is merely indicated. It is bolted to a sump ring 10 and an end plate 11. In the housing, there is an oil sump 12. A seal support ring 13 is seated on the inside of the end plate 11. The differential 5 comprises a differential housing 14, which forms part of the drive housing 2, differential wheels 15 with their shaft, a first output bevel wheel 16, which is firmly connected to the first output shaft 3, and a second output bevel wheel 17, which is firmly connected to the second output shaft 4.

The friction clutch 6 is likewise accommodated in the differential housing 14, in the inner coupling teeth 20 of which second disks (outer plates) 21 are arranged in a rotationally fixed but axially displaceable manner. First disks (inner plates) 22 are seated in a rotationally fixed manner on an inner clutch part 23, which is connected in a rotationally fixed manner to the first output bevel wheel 16. The friction clutch 6 also comprises a piston 24, which, on the one hand, exerts pressure on the plates 21, 22 and, on the other hand, forms a pressure chamber 26 with a valve plate 25 fixed in the differential housing 14.

The displacement machine 7 is accommodated in a pump housing 27 bolted to the differential housing 14 and essentially comprises an inner rotor 28, which is connected in a rotationally fixed manner to the first output shaft 3, and an eccentric outer rotor 29, which can rotate in the pump housing 27. Formed between the two rotors 28, 29 is a working space 30, the shape of which is determined by the construction of the displacement machine. At least one pressure passage leads from the working space 30 into the pressure space 26 of the friction clutch, it being possible for a plurality of pressure passages with corresponding automatically controlled devices to be provided, depending on the construction of the displacement machine.

Figure 2:
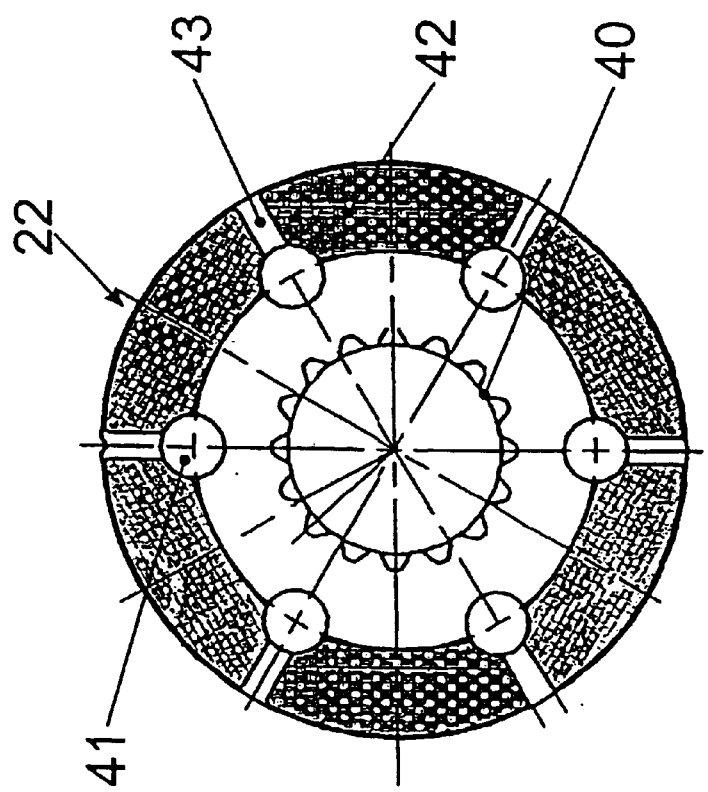
FIG. 2 shows a plan view of the first disks according to the invention.

FIG. 2 shows one of the first disks (inner plates), which is denoted overall by 22. It is a steel disk with a thickness of one millimeter, for example, and is in the form of a circular ring with coupling teeth 40 on its inner edge and holes 41 distributed around the circumference. On both sides, it has linings 42 that are distributed uniformly over the circumference and have radial channels 43. The linings are composed of carbon fibers, which can form an interwoven structure and are embedded in a matrix of carbon. They are expediently produced by CVD (chemical vapor deposition). The linings 42 are bonded to the steel disk and their thickness is approximately half that of the steel disk.

Figure 3:
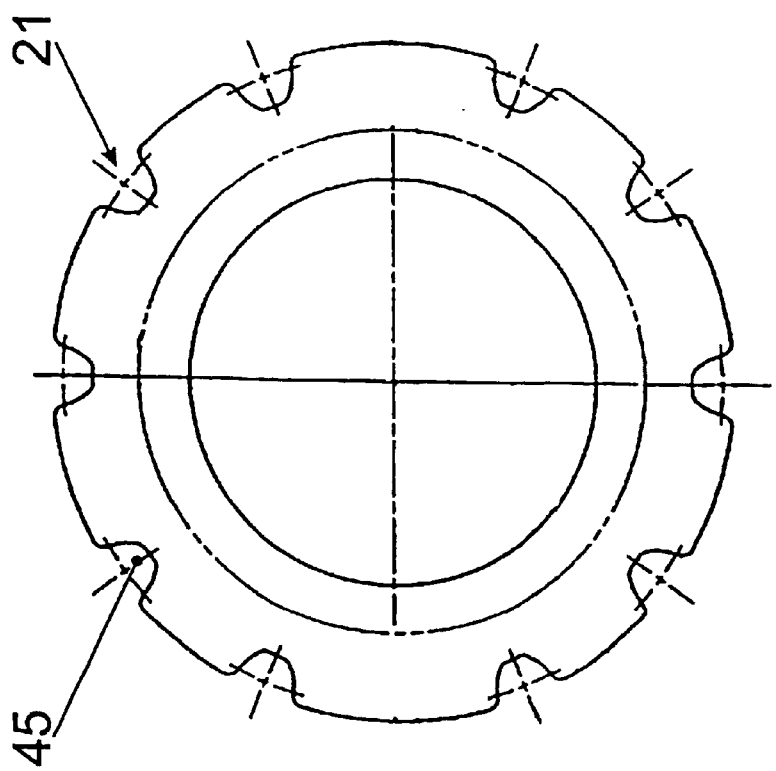
FIG. 3 shows a plan view of the second disks according to the invention.

In FIG. 3, the second disks (outer plates) are denoted overall by 21. They are steel disks with a nickel dispersion layer over the entire surface, i.e. on both sides. The nickel dispersion layer is preferably applied by electrodeposition. The layer is between 5 and 25 micrometers thick while its hardness is within a range of between 400 and 600 HV (Vickers hardness). To further improve its properties, the nickel dispersion layer can contain equally finely dispersed titanium nitrides. In the exemplary embodiment described, the proportion is between 2 and 5% by volume. Laminar deposition should be avoided when applying the dispersion layer since the best characteristics are obtained with crystalline deposition. To obtain a further improvement, nickel can be partially replaced in the nickel dispersion layer by cobalt up to a ratio of 70% of nickel to 30% of cobalt. The second disks 21 have coupling teeth 45 on their outer circumference.

With the tribosystem described, the desired positive gradient in the friction coefficient and hence the desired freedom from vibration and noise is achieved, even where operating times are very long.

What is claimed is:

1. A wet multi-disk clutch in part of a vehicle drive and a lubricant for a housing containing said clutch, comprising an input member (2) and an output member (3), and a number of first disks (22) and second disks (21), which are connected to the input member (2) and the output member (3) respectively and can be pressed together by actuating means (24), wherein a) the first disks (22) are composed of steel and their friction faces are linings (42) composed of carbon fibers embedded in a carbon matrix, which are interrupted by channels (43) leading from the inside outward, and b) the second disks (21) are composed of steel and their friction faces are provided with a nickel dispersion layer.

2. The wet multi-disk clutch as claimed in claim 1, wherein the nickel dispersion layer has an at least partially crystalline structure.

3. The wet multi-disk clutch as claimed in claim 1, wherein the nickel dispersion layer of the second disks (21) contains 2% to 5% by volume of uniformly dispersed titanium nitride.

4. The wet multi-disk clutch as claimed in claim 1, wherein the nickel dispersion layer of the second disks (21) contains 10% to 35% by volume of uniformly dispersed cobalt.

5. A coupling that senses a differential rotational speed between an input member and an output member comprises a wet multi-disk clutch having a number of first disks (22) and second disks (21), which are connected to the input member (2) and the output member (3) respectively and can be pressed together by actuating means (24), wherein a) the first disks (22) are composed of steel and their friction faces are linings (42) composed of carbon fibers embedded in a carbon matrix, which are interrupted by channels (43) leading from the inside outward, and b) the second disks (21) are composed of steel and their friction faces are provided with a nickel dispersion layer.

6. A coupling according to claim 5, wherein the nickel dispersion layer has an at least partially crystalline structure.

7. A coupling according to claim 5, wherein the nickel dispersion layer of the second disks (21) contains 2% to 5% by volume of uniformly dispersed titanium nitride.

8. A coupling according to claim 5, wherein the nickel dispersion layer of the second disks (21) contains 10% to 35% by volume of uniformly dispersed cobalt.

* * * * *